United States Patent [19]

Murakami et al.

[11] Patent Number: 5,506,719
[45] Date of Patent: Apr. 9, 1996

[54] OPTICAL SCANNING DEVICE

[75] Inventors: Kazunori Murakami, Osaka; Tomonori Ikumi, Shizuoka, both of Japan

[73] Assignee: Kabushiki Kaisha TEC, Shizuoka, Japan

[21] Appl. No.: 289,203

[22] Filed: Aug. 12, 1994

[30] Foreign Application Priority Data

| Aug. 13, 1993 | [JP] | Japan | 5-201332 |
| Oct. 19, 1993 | [JP] | Japan | 5-260526 |
| Jun. 6, 1994 | [JP] | Japan | 6-123436 |

[51] Int. Cl.$^6$ .................................... G02B 26/08
[52] U.S. Cl. .................... 359/216; 359/206; 359/210; 359/217; 359/218; 347/259; 347/261; 250/236
[58] Field of Search .................... 359/216–219, 359/209–210, 206, 811, 813, 819, 822–823; 250/234–236; 347/256–261, 263; 358/296; 464/474, 170

[56] References Cited

U.S. PATENT DOCUMENTS

| 4,613,877 | 9/1986 | Spencer et al. | 359/217 |
| 4,932,732 | 6/1990 | Nakajima | 359/210 |
| 5,134,513 | 7/1992 | Morimoto | 359/216 |
| 5,136,160 | 8/1992 | Nakane et al. | 250/235 |
| 5,142,404 | 8/1992 | Shiraishi et al. | 359/218 |
| 5,162,938 | 11/1992 | Iima et al. | 359/216 |
| 5,239,403 | 8/1993 | Shiraishi et al. | 359/218 |
| 5,245,481 | 9/1993 | Kaneko et al. | 359/218 |

FOREIGN PATENT DOCUMENTS

| 63-210807 | 9/1988 | Japan. |
| 4-75015 | 3/1992 | Japan. |

*Primary Examiner*—James Phan
*Attorney, Agent, or Firm*—Oblon, Spivak, McClelland, Maier & Neustadt

[57] ABSTRACT

An optical scanning device for leading a laser beam emitted from a semiconductor laser diode through a collimator lens, an imaging lens, and a cylindrical lens to a plurality of reflecting surfaces of a rotatable polygon mirror, and scanning a surface to be scanned movable in a vertical scanning direction with the laser beam reflected on the reflecting surfaces of the polygon mirror and transmitted through a correcting lens. The optical centers of the semiconductor laser diode, the collimator lens, the cylindrical lens, a return mirror, and the correcting lens are located in a plane containing an axis of rotation of the polygon mirror. The semiconductor laser diode, the collimator lens, and the cylindrical lens are located over an upper surface of the polygon mirror. Accordingly, an optical system can be formed in symmetry with respect to a center axis of an optical path of a horizontal scanning light beam from the polygon mirror without interference of the semiconductor laser diode, etc. with the optical path of the horizontal scanning light beam. Thus, the size and weight of the optical scanning device can be reduced, and the optical characteristics and the productivity of the optical scanning device can be improved.

13 Claims, 11 Drawing Sheets

OPTICAL SCANNING DEVICE

BACKGROUND OF THE INVENTION

1. Field of the Invention

The present invention relates to an optical scanning device employing a laser beam utilizable in a laser printer, laser facsimile, digital copying machine, etc.

2. Description of the Related Art

An electrophotographic process has been developed as a simple and high-quality printing process in recent years, and an optical scanning device is conventionally known as a device capable of realizing this process. For example, a post-objective type of optical scanning device has such a structure that a collimator lens, an imaging lens, and a cylindrical lens are sequentially located on an optical path of a laser beam emitted from a semiconductor laser diode; that a plurality of reflecting surfaces of a polygon mirror rotatably supported by a drive motor are located on an optical path of the laser beam transmitted through the cylindrical lens; that a correcting lens is located on an optical path of a horizontal scanning light beam from the polygon mirror; and that a surface to be scanned that is movable in a vertical scanning direction of a rotatable photosensitive drum is located on an optical path of the light beam transmitted through the correcting lens.

In order to improve the optical characteristics of such an optical scanning device, it is necessary to position various optical components with a high accuracy. In an optical scanning device disclosed in Japanese Patent Laid-open No. Sho 63-210807, for example, a light emitting unit having a semiconductor laser diode, a collimator lens, etc. integrated together, a drive motor for rotatably supporting a polygon mirror, a reflecting mirror, a correcting lens, etc. are mounted in a single, flattened box-shaped housing.

The above-mentioned optical scanning device disclosed in Japanese Patent Laid-open No. Sho 63-210807 will now be more described. To prevent interference of the light emitting unit with the optical path of the horizontal scanning light beam from the polygon mirror, the light emitting unit is located aside the polygon mirror. The light emitting unit is designed so that the optical path of the horizontal scanning light beam from the polygon mirror is deflected by the reflecting mirror to emerge out of the housing. Accordingly, a surface to be scanned of a photosensitive drum is located under the housing. In this optical scanning device, the tilt of the reflecting surfaces of the polygon mirror is corrected by the correcting lens. To correct the tilt, the laser beam must be imaged in the vertical scanning direction on the reflecting surfaces of the polygon mirror, and this imaging of the laser beam is realized by the cylindrical lens. However, a focal position of the cylindrical lens possibly displaces from the reflecting surfaces of the polygon mirror in actual because of a component difference in astigmatism of the semiconductor laser diode, optical characteristics of the collimator lens, etc.

As means to eliminate such an error and image the laser beam on the reflecting surfaces of the polygon mirror by using the cylindrical lens, there has been disclosed an optical scanning device in Japanese Patent Laid-open No. Hei 4-75015, for example. In this optical scanning device, a lens holder having a cylindrical lower surface is slidably disposed in a V-shaped groove formed on an upper surface of a base, and a cylindrical lens is mounted upright on an upper surface of the lens holder in such a manner that the direction of an optical axis of the cylindrical lens coincides with the direction of sliding movement of the lens holder. Accordingly, the cylindrical lens and the lens holder are supported together slidably in the direction of the optical axis and are set at a proper position.

The above-mentioned optical scanning device in the related art have the following problems. In the former optical scanning device disclosed in Japanese Patent Laid-open No. Sho 63-210807, the various optical components are mounted commonly in the single housing to thereby effect high-precision arrangement of the various optical components and improve the optical characteristics. However, the following problems arise.

Firstly, as the various optical components are mounted in the flattened box-shaped housing having a large plan area, the housing is easily deformed because of a manufacturing error, aged change, temperature depending expansion/contraction, etc., and the deformation of the housing causes a reduction in position accuracy of the optical components to deteriorate the optical characteristics.

Secondly, as the light emitting unit is located aside the polygon mirror in order to prevent interference with the optical path of the horizontal scanning light beam, the arrangement of an optical system is not symmetrical with respect to a center axis of the optical path of the horizontal scanning light beam, thus complicating the structure of the optical system to reduce the productivity.

Thirdly, to improve the optical characteristics of the horizontal scanning light beam incident on the surface to be scanned in the optical scanning device, it is desirable to adjust the positions of the various optical components individually in mounting them into the housing. However, in the structure that the various optical components are mounted in the single, flattened box-shaped housing, it is sometimes difficult to locate adjusting optical equipment in the housing. Accordingly, the adjustment of the optical components is difficult to reduce the productivity.

Fourthly, while such an optical scanning device is incorporated in an electrophotographic apparatus in actual use, there is a possibility of an error in relative position between the optical scanning device and a surface to be scanned as of a photosensitive drum incorporated in the electrophotographic apparatus independently of the optical scanning device. In this case, since it is difficult to adjust the position of the photosensitive drum around which a developer, a charger, etc. are arranged, the position of the optical scanning device is adjusted in general. In the optical scanning device disclosed in Japanese Patent Laid-open No. Sho 63-210807, however, the housing is flattened in shape and large in plan area, and it is connected to a frame of the electrophotographic apparatus at a plurality of positions. Accordingly, the adjustment of the position of the optical scanning device is very troublesome to cause a reduction in productivity of the electrophotographic apparatus.

On the other hand, in the latter optical scanning device disclosed in Japanese Patent Laid-open No. Hei 4-75015, the laser beam can be imaged on the reflecting surfaces of the polygon mirror by using the cylindrical lens adapted to be slid and positioned even when there occurs a component difference in astigmatism of the semiconductor laser diode, optical characteristics of the collimator lens, etc. However, the following problems arise.

Firstly, the mechanism of slidably mounting the cylindrical lens holder upright holding the cylindrical lens on the V-shaped groove formed on the upper surface of the base is complicated in structure to hinder the improvement in productivity of the optical scanning device.

Secondly, the mechanism of slidably supporting the cylindrical lens in the direction of the optical axis requires a structure that a portion for permitting the sliding movement of the cylindrical lens is so formed as to be elongated in the direction of the optical axis in order to ensure a good accuracy in positional adjustment of the cylindrical lens. However, as the mechanism of slidably supporting the cylindrical lens in the direction of the optical axis is large in size to hinder a reduction in size and weight of the optical scanning device as a whole and also to render difficult the arrangement of the collimator lens or the like near the cylindrical lens in the direction of the optical axis.

SUMMARY OF THE INVENTION

It is a first object of the present invention to provide an optical scanning device which can maintain a high-precision positioned condition of optical components to maintain good optical characteristics.

It is a second object of the present invention to provide an optical scanning device which can simplify the structure of an optical system to improve the productivity by locating the optical system in symmetry with respect to a center axis of an optical path of a horizontal scanning light beam.

It is a third object of the present invention to provide an optical scanning device which can make the adjustment of the optical components easy to improve the productivity.

It is a fourth object of the present invention to provide an optical scanning device which can make the positional adjustment with respect to a surface to be scanned to improve the productivity.

It is a fifth object of the present invention to provide an optical scanning device which is simple in structure.

It is a sixth object of the present invention to provide an optical scanning device which is compact.

The optical scanning device according to the present invention includes a semiconductor laser diode, a rotatable polygon mirror having a plurality of reflecting surfaces located on an optical path of a laser beam emitted from the semiconductor laser diode, at least a collimator lens, an imaging lens, and a cylindrical lens located on the optical path of the laser beam between the semiconductor laser diode and the reflecting surfaces of the polygon mirror, a surface to be scanned located on an optical path of a horizontal scanning light beam from the reflecting surfaces of the polygon mirror, the surface to be scanned being movable in a vertical scanning direction, and at least a correcting lens located on the optical path of the horizontal scanning light beam between the reflecting surfaces of the polygon mirror and the surface to be scanned; wherein optical centers of the semiconductor laser diode, the collimator lens, the cylindrical lens, a return mirror, and the correcting lens are located in a plane containing an axis of rotation of the polygon mirror; and the semiconductor laser diode, the collimator lens, and the cylindrical lens are located over an upper surface of the polygon mirror. Accordingly, a housing for accommodating these optical components can be made compact rather than large and flattened, and the deformation of the housing due to aged change, temperature depending expansion/contraction, etc. can be made minute to thereby maintain a high precision of positions of the optical components, thus maintaining good optical characteristics. Furthermore, the optical system can be located in symmetry with respect to a center axis of an optical path of a horizontal scanning light beam from the polygon mirror without interference of the semiconductor laser diode etc. with the horizontal scanning light beam. Accordingly, the structure of the optical system can be simplified to thereby improve the productivity.

DETAILED DESCRIPTION OF THE PREFERRED EMBODIMENTS

Figure 1:
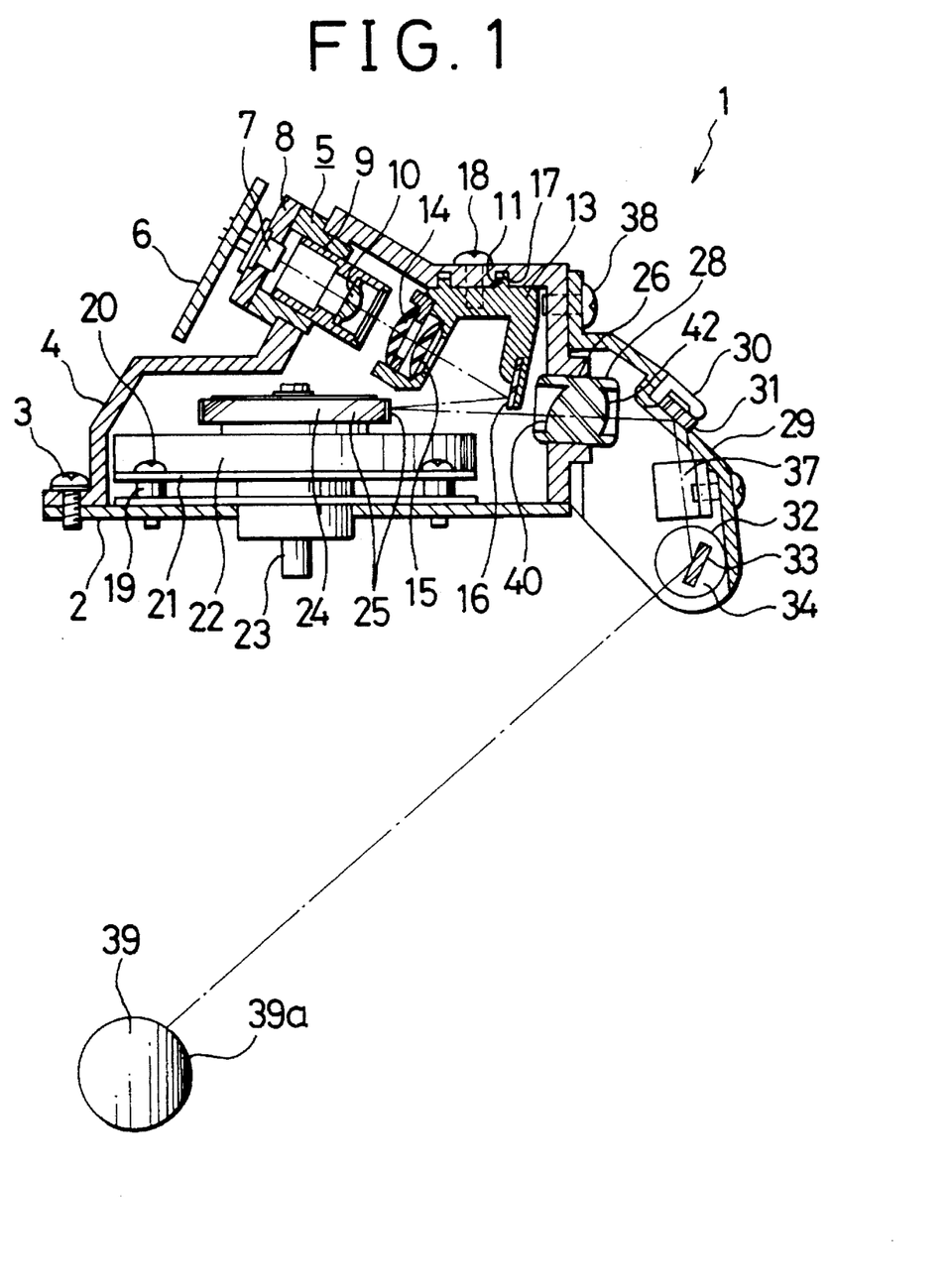
FIG. 1 is a vertical sectional side view of an optical scanning device according to a first preferred embodiment of the present invention, showing an internal structure of the device.
Figure 2:
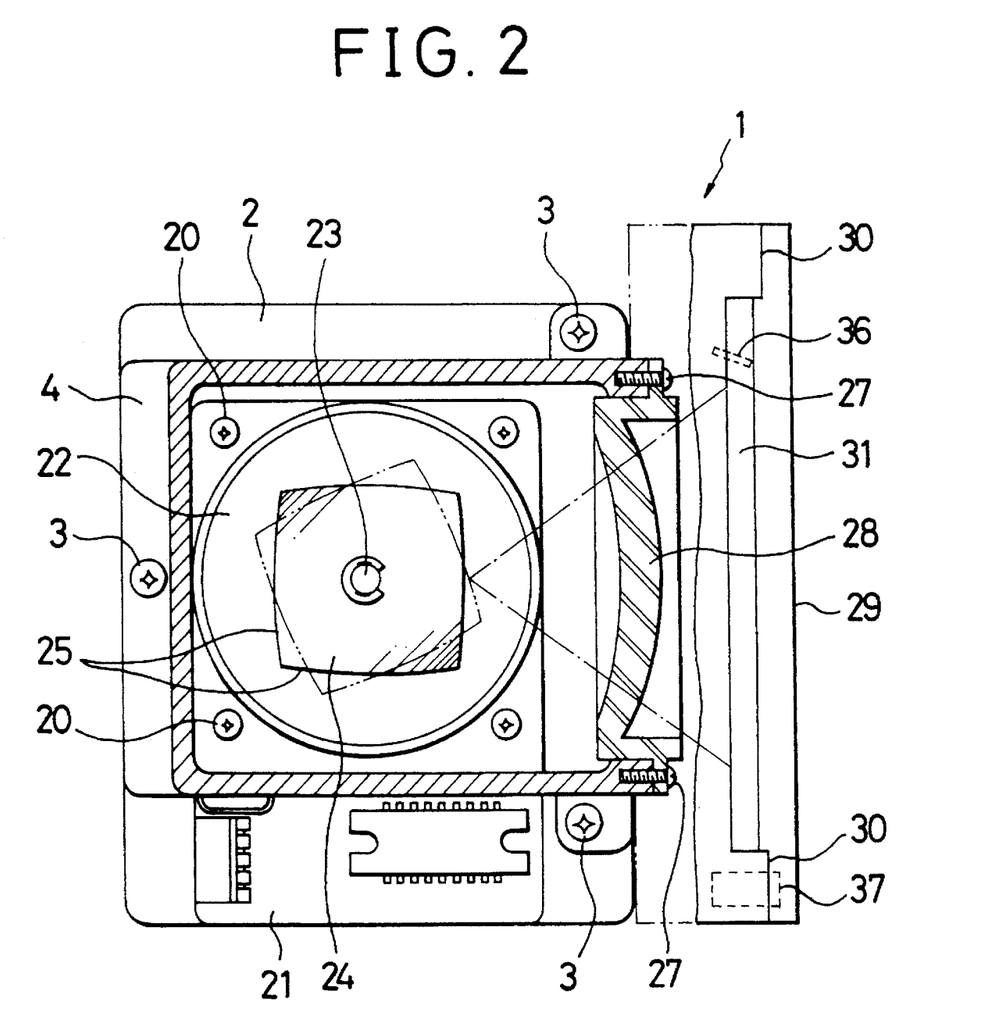
FIG. 2 is a horizontal sectional plan view of the optical scanning device shown in FIG. 1 with a housing of the device partially broken away.
Figure 3:
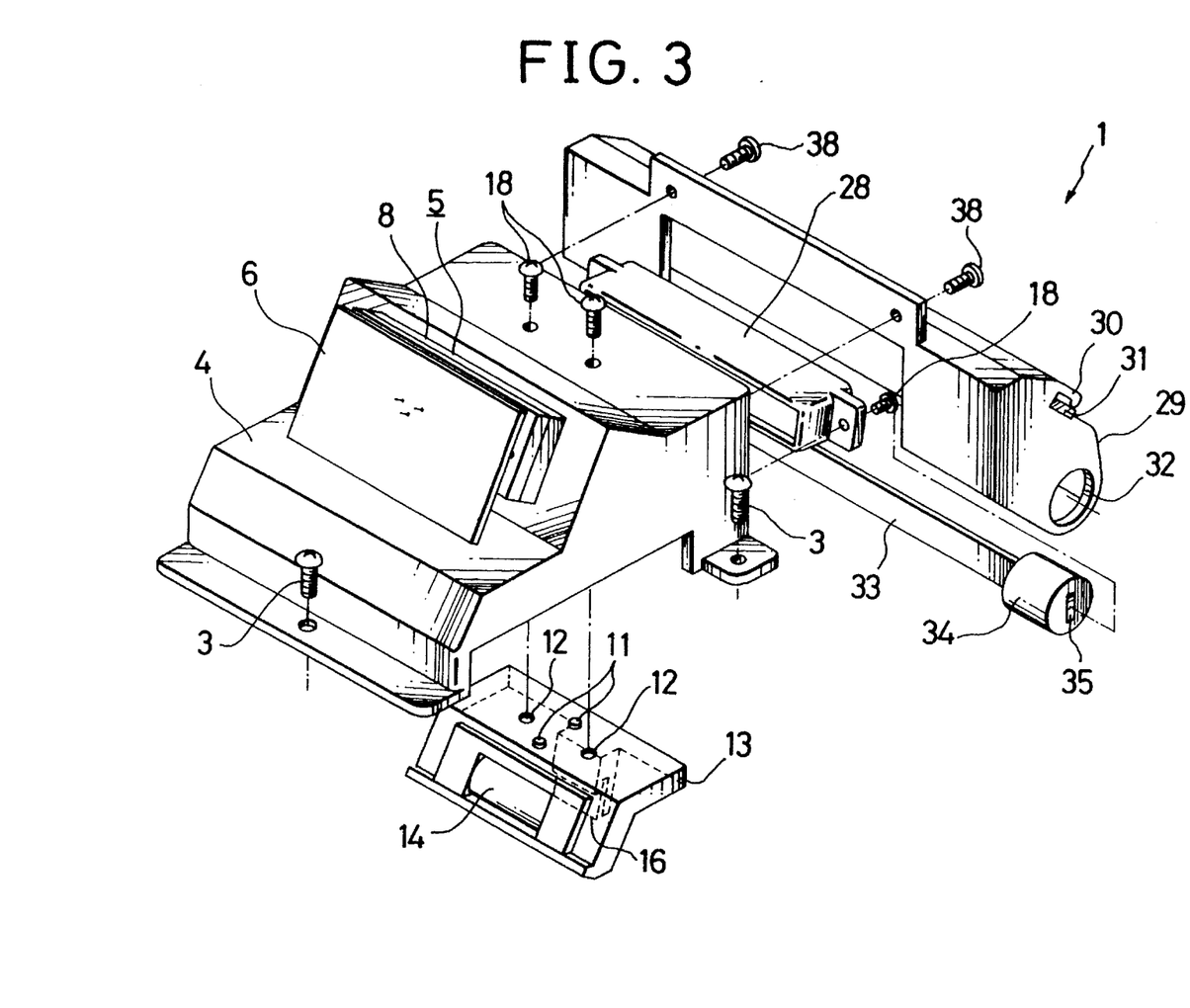
FIG. 3 is an exploded perspective view of an essential part of the optical scanning device shown in FIG. 1, showing a mounting structure.

A first preferred embodiment of the present invention will now be described with reference to FIGS. 1 to 5. An optical scanning device 1 according to this preferred embodiment is a post-objective type of optical scanning device. As shown in FIGS. 1 to 3, the optical scanning device 1 consists of a base 2 having a scanner motor 22 as a drive motor; a housing 4 mounted on the base 2; a light emitting unit 5 having a semiconductor laser diode 7, etc.; an internal frame 13 having various lenses; and an external frame 29 having external reflecting mirrors 31 and 33 for deflecting a laser beam toward a photosensitive drum 39, wherein the latter three members are mounted in the housing 4.

The housing 4 is mounted on the plate-like base 2 by three screws 3.

The light emitting unit 5 is mounted at an upper portion of the housing 4 in a downward inclined condition. The semiconductor laser diode 7 of the light emitting unit 5 is mounted on a substrate 6, and is fixed to a heat sink 8 formed of metal. A cylindrical collimator barrel 9 is slidably mounted on the heat sink 8 and is fixed thereto by bonding or the like. A collimator lens 10 is fixed inside the collimator barrel 9.

The internal frame 13 has an upper surface formed with two projections 11 and two tapped holes 12. The two projections 11 are engaged with two recesses 17 formed on a lower surface of an upper portion of the housing 4. In this condition, two screws 18 are engaged with the two tapped holes 17 to secure the internal frame 13 to the housing 4. Fixed to the internal frame 13 are a cylindrical lens 14, a plano-convex lens 15 as an imaging lens, and a return mirror 16. In the condition where the internal frame 13 is secured to the housing 4, the optical axes of the cylindrical lens 14 and the plano-convex lens 15 are positioned on the optical path of the laser beam emitted from the light emitting unit 5.

A substrate 21 as a part of the scanner motor 33 is mounted through spacers 19 on the base 2 by four screws 20. A polygon mirror 24 is horizontally rotatably supported to a vertically extending, rotating shaft 23 of the scanner motor 22. The polygon mirror 24 has four reflecting surfaces 25 each formed as an elliptic cylindrical surface having an elliptic shape in horizontal section.

A light beam reflected on the return mirror 16 fixed to the internal frame 13 is designed to fall upon each reflecting surface 25 of the polygon mirror 24 in a direction slightly upward tilted from a horizontal direction. Accordingly, a skew optical system is formed so that the optical axes of an incoming beam and an outgoing beam are inclined with respect to each rotating reflecting surface 25. The plano-convex lens 15 fixed to the internal frame 13 is designed to converge the incoming laser beam at a virtual converging point existing behind each reflecting surface 25 of the polygon mirror 24, and the cylindrical lens 14 is designed to converge the incoming laser beam on each reflecting surface 25 in a vertical scanning direction only.

A correcting lens 28 is mounted to the housing 4 at a position lying on the optical path of a reflected light beam from each reflecting surface 25 of the polygon mirror 24. The correcting lens 28 is engaged with a rectangular through hole 26 formed through a front portion of the housing 4, and is mounted thereto by two screws 27. The correcting lens 28 has a special shape so as to improve various optical characteristics, and the detail of such a special shape will be hereinafter described.

With the above-mentioned structure of the optical scanning device 1 according to this preferred embodiment, the optical axes of the semiconductor laser diode 7, the collimator lens 10, the cylindrical lens 14, the plano-convex lens 15, the return mirror 16, and the correcting lens 28 are positioned in a plane containing an axis of rotation of the polygon mirror 24. Furthermore, the semiconductor laser diode 7, the collimator lens 10, the cylindrical lens 14, and the plano-convex lens 15 are positioned over an upper surface of the polygon mirror 24. In more detail, the semiconductor laser diode 7 and the collimator lens 10 are positioned in a projection area of the polygon mirror 24. Although the cylindrical lens 14 and the plano-convex lens 15 are positioned slightly outside of the projection area of the polygon mirror 24, i.e., a region above the mirror 24 which is defined by vertical planes colinear with sides of the mirror, they are positioned over an upper surface of the scanner motor 22. It is to be noted that the axis of rotation of the polygon mirror 24 mentioned herein means a conceptual center axis of rotation of the polygon mirror 24 but does not mean the rotating shaft 23 as a component for supporting the polygon mirror 24.

As shown in FIGS. 1 to 3, the external frame 29 mounted on the housing 4 is formed with two recesses 30 at the front, opposite sides, and a first external reflecting mirror 31 elongated in a horizontal scanning direction is elastically mounted in the recesses 30. Two circular through holes 32 are formed at lower, opposite sides of the external frame 29, and two cylindrical members 34 as a mirror adjusting mechanism are engaged with the two circular through holes 32, respectively, so as to be rotatable in the vertical scanning direction. The two cylindrical members 34 are fixed to opposite ends of a second external reflecting mirror 33 elongated in the horizontal scanning direction. The outer end surface of each cylindrical member 34 is formed with an angle adjusting groove 35 adapted to receive the tip of a flat screwdriver (not shown), so that both cylindrical members 34 can be rotated in the through holes 32 by using the flat screwdriver to thereby adjust the angle of the second external reflecting mirror 33. After adjustment of the angle, both cylindrical members 34 are fixed within the through holes 32 by bonding or the like. A small-sized reflecting mirror 36 is fixed to the external frame 29 at a position under one longitudinal end portion of the first external reflecting mirror 31, and an optical sensor 37 for detecting a writing position is mounted to the external frame 29 at a position opposed to the reflecting mirror 36 under the other longitudinal end portion of the first external reflecting mirror 31.

The external frame 29 is mounted on the front surface of the housing 4 by two screws 38. Accordingly, the first external reflecting mirror 31 and the reflecting mirror 36 are positioned on an optical path of a reflected light beam from each reflecting surface 25 of the polygon mirror 24, and the correcting mirror 28 is also positioned on this optical path so as to be interposed between each reflecting surface 25 and the mirrors 31 and 36. Further, the optical sensor 37 is positioned on an optical path of a reflected light beam from the reflecting mirror 36, and the second external reflecting mirror 33 is positioned on an optical path of a reflected light beam from the first external reflecting mirror 31. The photosensitive drum 39 supported rotatably in the vertical scanning direction has a cylindrical surface 39a to be scanned. The cylindrical surface 39a of the photosensitive drum 39 is positioned on an optical path of a reflected light beam from the second external reflecting mirror 33.

Figure 4:
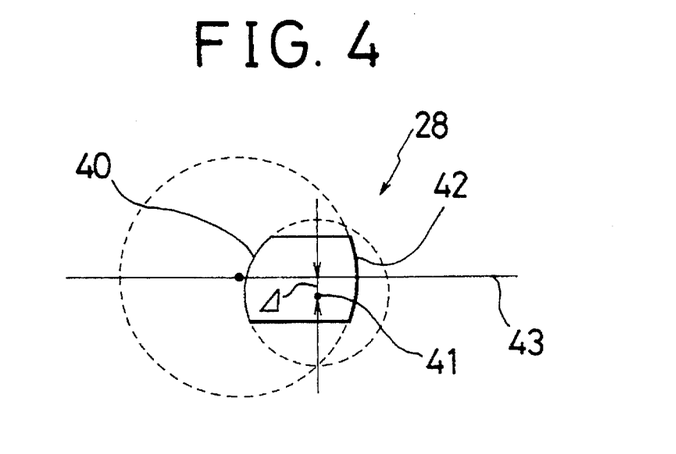
FIG. 4 is a vertical sectional side view diagrammatically illustrating the shape of a correcting lens of the optical scanning device shown in FIG. 1.

The detail of the correcting lens 28 will now be described. As shown in FIG. 4, an incident surface 40 of the correcting lens 28 is formed by a rotationally symmetric curved surface such that a rotational axis 41 parallel to the horizontal scanning direction is located at a position displaced in the vertical scanning direction from the center of the optical path of the horizontal scanning light beam and that the envelope is an even, higher-order curved line, whereas an emergent surface 42 of the correcting lens 28 is formed by a rotationally symmetric curved surface such that a rotational axis 43 perpendicular to both the horizontal scanning direction and the vertical scanning direction is located at the center of the optical path of the horizontal scanning light beam and that the envelope is an even, higher-order curved line.

Figure 5A:
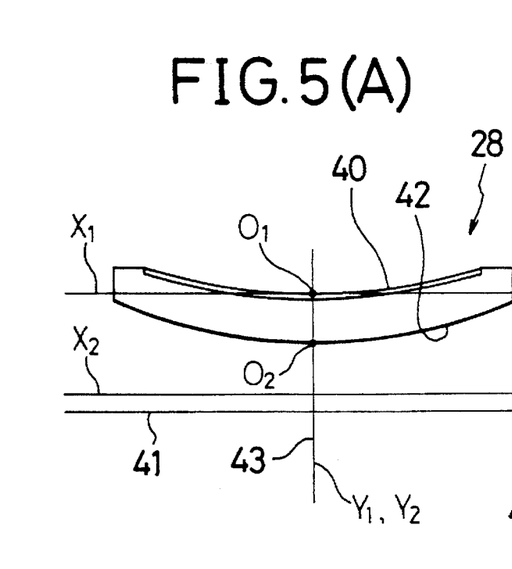
FIG. 5(a) is a plan view diagrammatically illustrating the shape of the correcting lens.
Figure 5B:
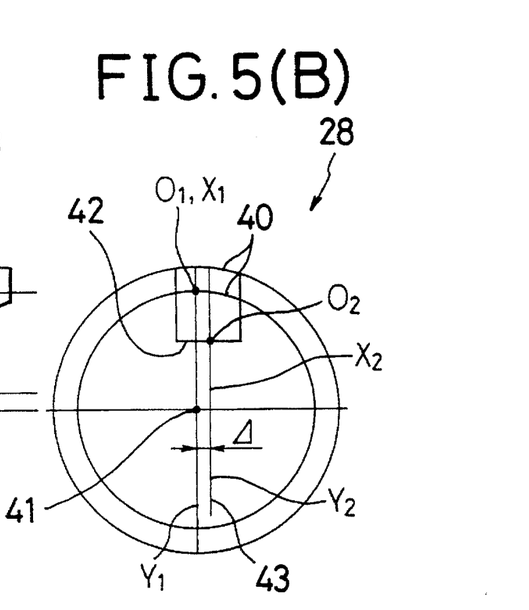
FIG. 5(b) is a vertical sectional side view diagrammatically illustrating the shape of the correcting lens.

In more detail, referring to FIGS. 5(a) and 5(b), a reference axis $X_1$ parallel to the horizontal scanning direction is set on an origin $O_1$ displaced by a certain amount in the vertical scanning direction from a center point of the incident surface 40 of the correcting lens 28, and a reference axis $Y_1$ perpendicular to both the horizontal scanning direction and the vertical scanning direction is also set on the origin $O_1$. In this case, the shape of the incident surface 40 in cross section taken in a direction perpendicular to the vertical scanning direction is formed by an eight-order curved line on the $Y_1$, $O_1$, $X_1$ coordinate plane, which curved line is expressed by the following polynomial.

$$Y_1 = \alpha_2 X_1^2 + \alpha_4 X_1^4 + \alpha_6 X_1^6 + \alpha_8 X_1^8 - e_1$$

Further, a reference axis $Y_2$ perpendicular to both the horizontal scanning direction and the vertical scanning direction is set on a center point $O_2$ of the emergent surface 42 of the correcting lens 28, and a reference axis $X_2$ parallel to the horizontal scanning direction is set at a position displaced by a distance $e_2$ from the center point $O_2$. In this case, the shape of the emergent surface 42 in cross section taken in a direction perpendicular to the vertical scanning direction is formed by an eight-order curved line expressed by the following polynomial.

$$Y_2 = \beta_2 X_2^2 + \beta_4 X_2^4 + \beta_6 X_2^6 + \beta_8 X_2^8 - e_2$$

In the above structure, the laser beam emitted from the semiconductor laser diode 7 is collimated by the collimator lens 10, and is then converged by the cylindrical lens 14 and the plano-convex lens 15. The converged light beam is deflected in the horizontal scanning direction by the rotating reflecting surfaces 25 of the polygon mirror 24. The horizontal scanning light beam is optically corrected by the correcting lens 28, and is then incident on the cylindrical surface 39a of the photosensitive drum 39 rotating in the vertical scanning direction. Accordingly, horizontal scanning lines by the optical scanning are sequentially formed in the vertical scanning direction on the cylindrical surface 39a of the photosensitive drum 39. For example, image formation by an electrophotographic process can be carried out by locating a charger and a developer in opposed relationship to the cylindrical surface 39a of the photosensitive drum 39, optically scanning the cylindrical surface 39a of the photosensitive drum 39 charged by the charger to form an electrostatic latent image on the cylindrical surface 39a, developing the electrostatic latent image with toner supplied from the developer, and transferring a toner image onto a recording medium. Further, the scanning light beam from the polygon mirror 24 is reflected on the reflecting mirror 36 and is then detected by the optical sensor 37, thereby performing the image formation as mentioned above according to a detection timing of the optical sensor 37.

As mentioned above, the outgoing light beam from the semiconductor laser diode 7, the collimator lens 10, the cylindrical lens 14, and the plano-convex lens 15 is deflected by the return mirror 16. Therefore, the optical components including the semiconductor laser diode 7, the collimator lens 10, the cylindrical lens 14, and the plano-convex lens 15 can be located in a plane containing the rotational axis of the polygon mirror 24 and over the polygon mirror 24. Accordingly, the optical system can be formed in symmetry with respect to the center axis of the optical path of the horizontal scanning light beam from the polygon mirror 24 without interference of the semiconductor laser diode 7 etc. with the horizontal scanning light beam, thereby simplifying the structure of the optical system. Accordingly, the productivity can be improved.

The optical scanning device 1 according to this preferred embodiment is compact in size so that a plan area of the housing 4 is substantially equal to that of the scanner motor 22. Accordingly, deformation of the housing 4 due to a manufacturing error, age change, or temperature depending expansion/contraction can be made minute. As a result, in the optical scanning device 1 with a high precision of relative positions of the optical components including the semiconductor laser diode 7, the polygon mirror 24, and the correcting lens 28 mounted to the housing 4, the optical characteristics can be greatly improved.

In the optical scanning device 1 according to this preferred embodiment, the base 2 of the scanner motor 22 rotatably supporting the polygon mirror 24 is extended externally, and the optical components including the semiconductor laser diode 7, the collimator lens 10, and the correcting lens 28 are mounted in the single housing 4 mounted on the base 2. Further, the first and second external reflecting mirrors 31 and 33 for deflecting the optical path of the light beam transmitted through the correcting lens 28 toward the cylindrical surface 39a of the photosensitive drum 39 is mounted on the outer surface of the housing 4 equipped with the optical components. Accordingly, in a condition where the housing 4 equipped with the light emitting unit 5, the cylindrical lens 14, the plano-convex lens 15, etc. is not mounted on the base 2 of the scanner motor 22, a two-dimensional area sensor (not shown) may be located at the position of the reflecting surfaces 25 of the polygon mirror 24 to carry out one-dimensional adjustment of the light emitting unit 5 and positional adjustment of the cylindrical lens 14. Further, in a condition where the external frame 29 is not mounted on the front surface of the housing 4 mounted on the base 2 of the scanner motor 22, a beam diameter evaluating device (not shown) may be located at a focal position of the correcting lens 28 to evaluate a beam diameter of the horizontal scanning light beam, thereby carrying out the one-dimensional adjustment of the light emitting unit 5. Accordingly, high-precision arrangement of the optical components can be easily made, thereby improving the productivity.

In the optical scanning device 1 according to this preferred embodiment, the second external reflecting mirror 33 is supported to the cylindrical members 34 so as to be rotatable in the vertical scanning direction. Accordingly, even if there is generated an error in relative position between the optical scanning device 1 and the photosensitive drum 39 installed in an electrophotographic apparatus due to a manufacturing error, aged change, etc., the second external reflecting mirror 33 can be adjusted in position to thereby properly direct the horizontal scanning light beam from the optical scanning device 1 to the cylindrical surface 39a of the photosensitive drum 39. Accordingly, the optical system can be properly adjusted by a simple operation without the need of adjustment of relative position between the optical scanning device 1, which is large in size and difficult to move, and the photosensitive drum 39. Thus, the above adjusting structure can contribute to the improvement in print quality and productivity of the electrophotographic apparatus.

In the optical scanning device 1 according to this preferred embodiment, the center of the incident surface 40 of the correcting lens 28 is displaced by the certain amount in the vertical scanning direction, thereby suppressing deformation of a spot shape due to coma of the correcting lens 28 or influence such as stray light due to internal reflection in the correcting lens 28 to thereby improve an image quality. Actually, simulation was made by setting concrete parameters to determine various optical characteristics, and good results were confirmed.

The optical characteristics of stray light outgoing from the emergent surface 42 of the correcting lens 28 after double internal reflection in the correcting lens 28 were examined to confirm that displacement of the stray light in the vertical scanning direction was larger than that of the original scanning light. In other words, the stray light as mentioned above can be let emerge from the correcting lens 28 to a position displaced in the vertical scanning direction more largely than the original scanning light, and therefore the entrance of the stray light to the photosensitive drum 39 can be greatly easily prevented. Thus, a noise component due to the stray light can be reduced to contribute to the improvement in image quality.

An adjusting method for the optical system by way of example will now be described in relation to a process of constructing the optical scanning device 1. The light emitting unit 5 is first temporarily constructed by fixing the semiconductor laser diode 7 mounted on the substrate 6 to the metal heat sink 8, fixing the collimator lens 10 to the collimator barrel 9, and slidably mounting the heat sink 8 on the collimator barrel 9. Then, centering of the collimator lens 10 and the semiconductor laser diode 7 of the light emitting unit 5 by using an autocollimator (not shown), and thereafter the collimator barrel 9 and the heat sink 8 are fixed together by bonding or the like, thus completely constructing the light emitting unit 5.

Next, the light emitting unit 5 is temporarily slidably mounted on the housing 4, and the internal frame 13 preliminarily equipped with the cylindrical lens 14, the plano-convex lens 15, and the return mirror 16 is secured to the housing 4 by the screws 18. In this condition, the two-dimensional area sensor is located at the position of the reflecting surfaces 25 of the polygon mirror 24 to generally carry out the one-dimensional adjustment of the light emitting unit 5 and the positional adjustment of the cylindrical lens 14 in the vertical scanning direction.

After ending the above adjustments, the two-dimensional area sensor is removed from the housing 4, and the housing 4 is fixed by the screws 3 to the base 2 preliminarily equipped with the polygon mirror 24 and the scanner motor 22. Then, the correcting lens 28 is secured to the housing 4 by the screws 27. At this time, the external frame 29 is not yet mounted on the front surface of the housing 4. Accordingly, the beam diameter evaluating device is located at the focal position of the correcting lens 28 to evaluate the beam diameter and highly accurately carry out the one-dimensional adjustment of the light emitting unit 5.

Next, the light emitting unit 5 thus subjected to the high-precision one-dimensional adjustment is fixed to the housing 4, and the external frame 29 preliminarily equipped with the first and second external reflecting mirrors 31 and 33 is fixed to the housing 4 by the screws 38. In this condition, the reflecting mirror 36 temporarily mounted to the external frame 29 is adjusted in angle to adjust the optical path of an incident light beam to the optical sensor 37. Thereafter, the reflecting mirror 36 is fixed to the external frame 29 by bonding or the like.

The optical scanning device 1 thus constructed is attached to a body (not shown) of the electrophotographic apparatus. In this condition, the cylindrical members 34 are rotated by the flat screwdriver to adjust the angle of the second external reflecting mirror 33 so that the scanning light beam reflected on the second external reflecting mirror 33 is directed to a given position on the cylindrical surface 39a of the photosensitive drum 39. Thereafter, the cylindrical members 34 are fixed to the external frame 29 by bonding or the like.

In the optical scanning device 1 according to this preferred embodiment, the correcting lens 28 having the optical characteristics as mentioned above is located near the polygon mirror 24. Accordingly, the length of the correcting lens 28 in the horizontal scanning direction can be reduced to thereby contribute to a reduction in size and weight of the device as a whole.

In the optical scanning device 1 according to this preferred embodiment, the scanning light beam transmitted through the correcting lens 28 is deflected to the photosensitive drum 39 by the first and second external reflecting mirrors 31 and 33. However, the scanning light beam transmitted through the correcting lens 28 may be deflected to the photosensitive drum 39 by a single external reflecting mirror (not shown).

Figure 6:
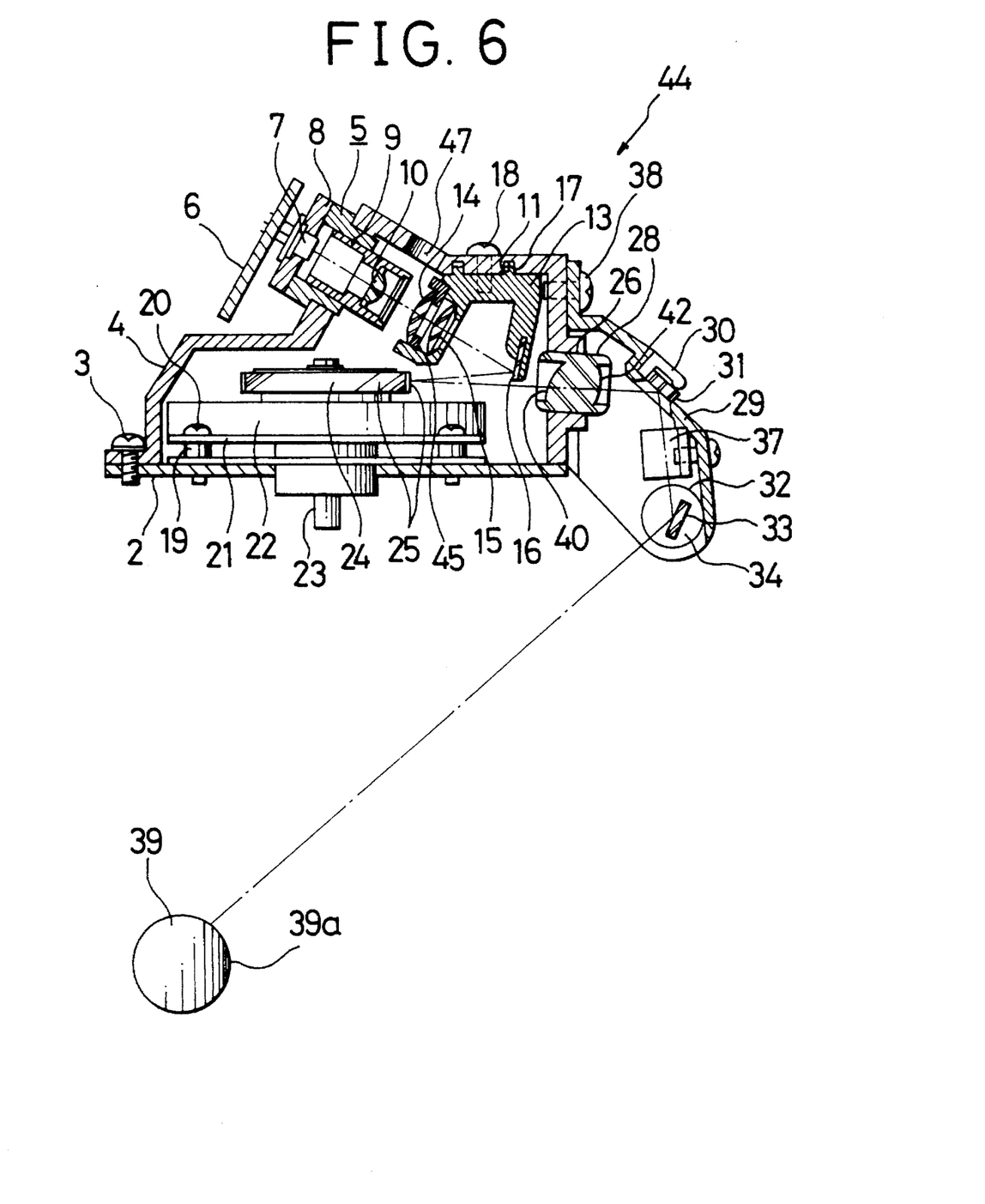
FIG. 6 is a vertical sectional side view of an optical scanning device according to a second preferred embodiment of the present invention, showing an internal structure of the device.
Figure 7:
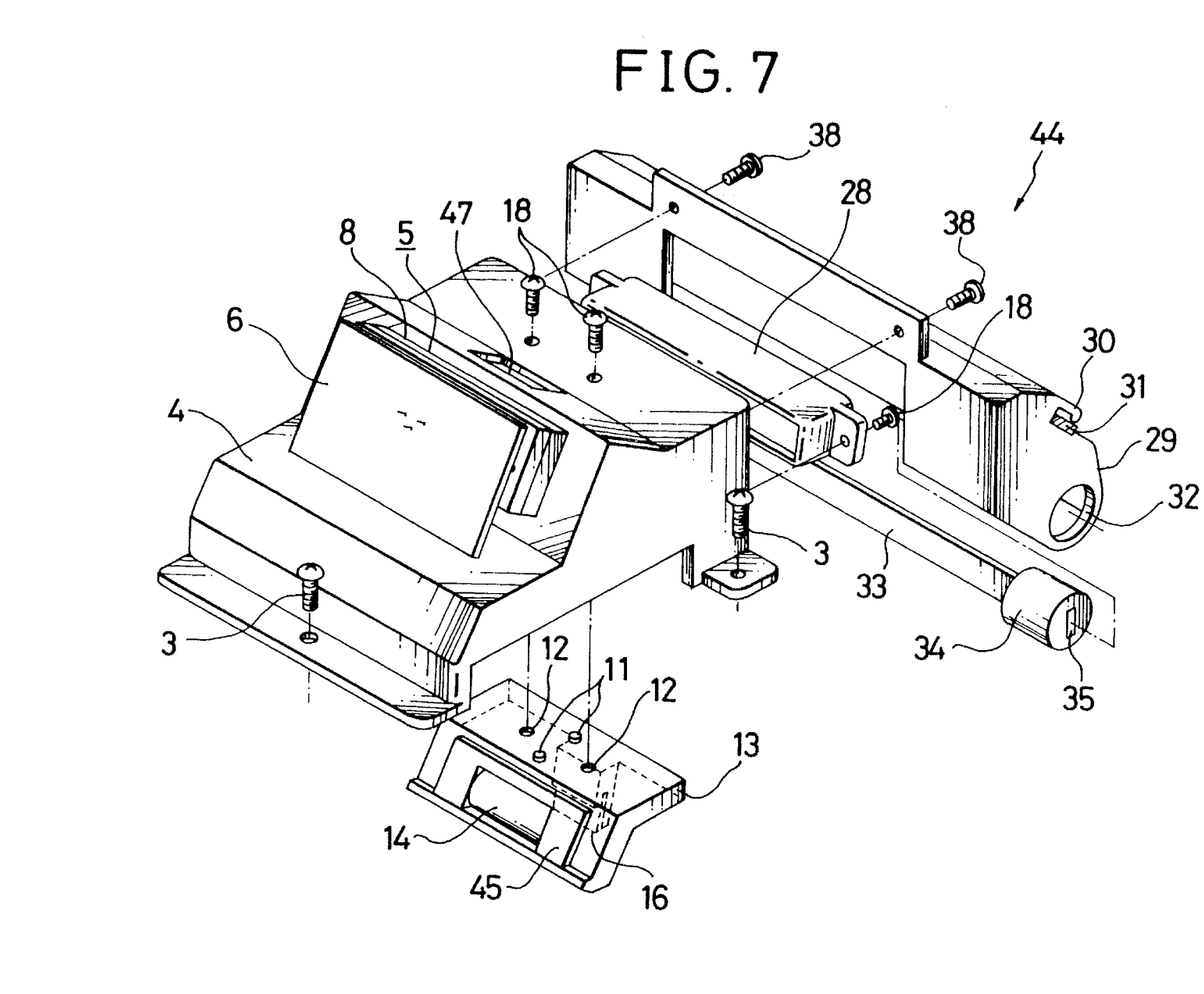
FIG. 7 is an exploded perspective view of an essential part of the optical scanning device shown in FIG. 6, showing a mounting structure.
Figure 8:
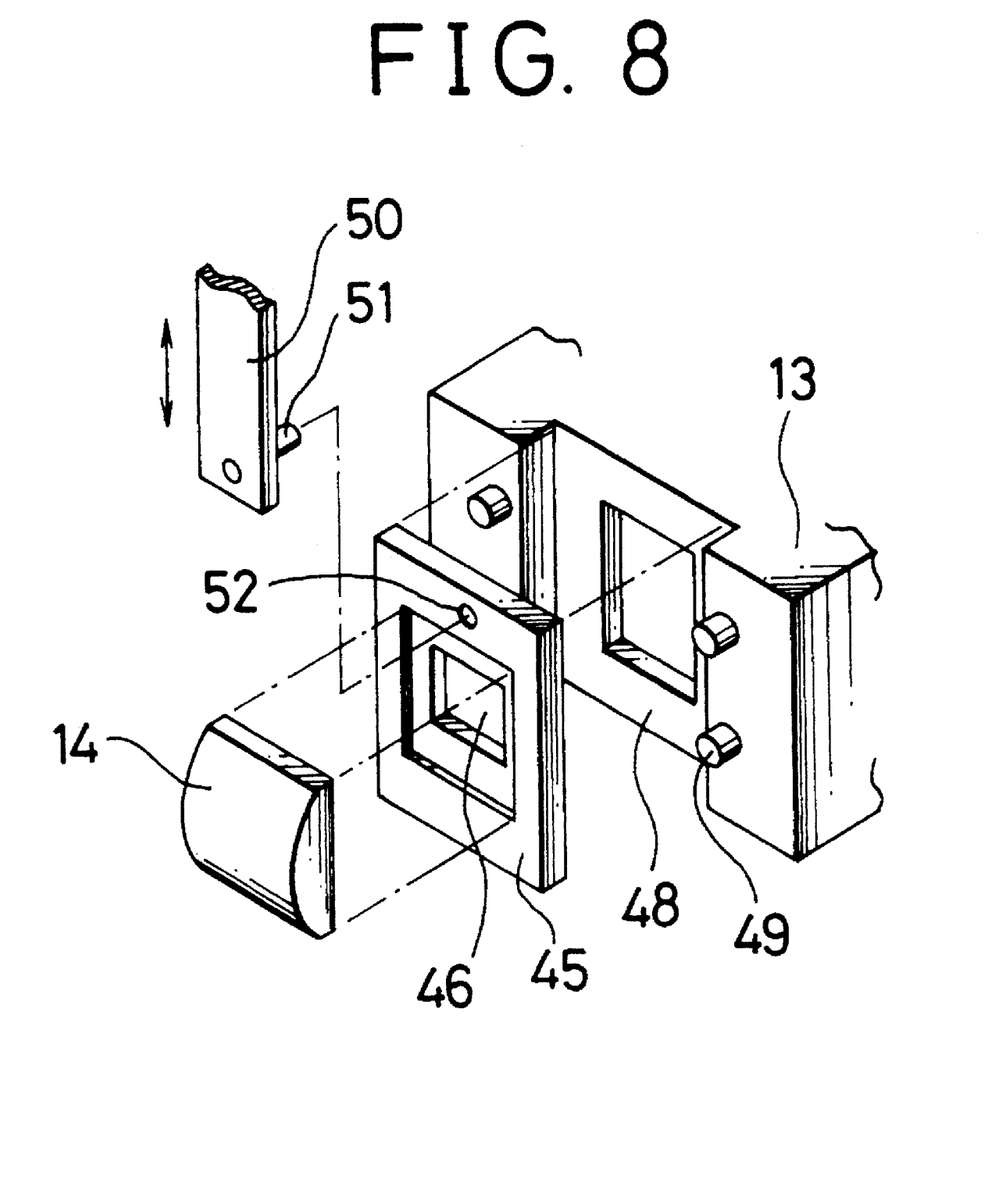
FIG. 8 is an exploded perspective view showing a mounting structure of a cylindrical lens plate as a lens supporting mechanism to an internal frame of the optical scanning device shown in FIG. 6.

A second preferred embodiment of the present invention will now be described with reference to FIGS. 6 to 13. The same parts as those in the first preferred embodiment will be identified by the same names and denoted by the same reference numerals, and the explanation thereof will be omitted. As shown in FIGS. 6 and 7, an optical scanning device 44 according to this preferred embodiment has a specific structure such that the cylindrical lens 14 is fixed to a cylindrical lens plate 45 as a lens supporting mechanism and that the cylindrical lens plate 45 is slidably mounted on the internal frame 13 and fixed thereto after positional adjustment of the cylindrical lens plate 45. As shown in FIG. 8, the cylindrical lens plate 45 is formed with a rectangular beam shaping hole 46 as an aperture for shaping a laser beam. The housing 4 is formed at its upper portion with a rectangular through hole 47 opening to the upper side of the cylindrical lens plate 45, so as to permit fine adjustment of the position of the cylindrical lens plate 45.

As previously mentioned, in order to realize the correction of tile of the polygon mirror 24, it is necessary to image the laser beam in the vertical scanning direction on the reflecting surfaces 25 of the polygon mirror 24 by using the cylindrical lens 14. However, the imaging on the reflecting surfaces 25 is hindered by a component difference in astigmatism of the semiconductor laser diode 7, optical characteristics of the collimator lens 10, etc. In the case where an optical error due to such a component difference is generated, the cylindrical lens plate 45 to which the cylindrical lens 14 is fixed is displaced in the vertical scanning direction on a plane perpendicular to its optical axis, thereby effecting the positional adjustment of the cylindrical lens 14. That is, the cylindrical lens 14 is vertically moved to change a position of entrance of the laser beam onto the incident surface of the correcting lens 28, thereby changing a focal position in the vertical scanning direction owing to spherical aberration.

The cylindrical lens plate 45 permitting the positional adjustment of the cylindrical lens 14 has a simple plate-like shape, and the flat emergent surface of the cylindrical lens 14 is fixed to one surface of the plate 45. Thus, the cylindrical lens plate 45 with the cylindrical lens 14 is simple in structure to contribute to the improvement in productivity of the optical scanning device 44. Furthermore, the cylindrical lens plate 45 is generally flat and the direction of the flat surface of the plate 45 is the same as the direction of sliding of the plate 45. Accordingly, a portion of the internal frame 13 on which the plate 45 slides is not required to be elongated in the direction of the optical axis of the cylindrical lens 14. Accordingly, the optical components including the plano-convex lens 15 and the return mirror 16 can be located near the cylindrical lens 14 in the direction of the optical axis, thereby contributing to a reduction in size and weight of the optical scanning device 44.

In the optical scanning device 44 according to this preferred embodiment, the cylindrical lens 14 for imaging the laser beam on the reflecting surfaces 25 of the polygon mirror 24 is slid in the vertical scanning direction. Accordingly, there is a possibility that the optical path of the light beam transmitted through the cylindrical lens 14 may be displaced in the vertical scanning direction by the sliding movement. However, since the second external reflecting mirror 33 for finally deflecting the scanning light beam to the photosensitive drum 39 is rotatable in the vertical scanning direction, the displacement of the optical path in the vertical scanning direction due to the sliding movement of the cylindrical lens 14 can be easily corrected by rotating the second external reflecting mirror 33.

A position adjusting method for the cylindrical lens 14 by way of example will now be described in relation to a part of a process of constructing the optical scanning device 44. First, the light emitting unit 5 preliminarily constructed is temporarily slidably mounted to the housing 4, and the internal frame 13 preliminarily equipped with the plano-convex lens 15 and the return mirror 16 is secured to the housing 4 by the screws 18. As shown in FIG. 8, the cylindrical lens plate 45 to which the cylindrical lens 14 is preliminarily fixed is fitted into a recess 48 formed on the internal frame 13. Then, projections 49 formed on the internal frame 13 are heated to be melted by a soldering iron or the like to hold the opposite side edges of the cylindrical lens plate 45. After cooling the melted projections 49 of the internal frame 13, the cylindrical lens plate 45 becomes slidable within the recess 48 in the vertical scanning direction as being held by the projections 49. In this condition, a jig 50 is inserted from the through hole 47 of the housing 4 to adjust the position of the cylindrical lens plate 45, that is, the position of the cylindrical lens 14.

In the optical scanning device 44 according to this preferred embodiment, the width of the recess 48 of the internal frame 13 is set substantially equal to the width of the cylindrical lens plate 45, thereby preventing rotation of the cylindrical lens plate 45 during the sliding movement. The cylindrical lens plate 45 thus slidable but unrotatable is formed at its upper portion with a single hole 52 adapted to engage a single projection 51 of the jig 50.

In performing the positional adjustment of the cylindrical lens 14, a two-dimensional area sensor (not shown) is located at the position of the reflecting surfaces 25 of the polygon mirror 24, and this sensor is used to adjust the position of the cylindrical lens 14 in the vertical scanning direction with the jig 50. After completing the positional adjustment of the cylindrical lens 14, the cylindrical lens plate 45 is fixed to the internal frame 13 by bonding or the like. Further, general one-dimensional adjustment of the light emitting unit 5 is also carried out by using the two-dimensional area sensor. After ending these adjustments, the optical scanning device 44 is constructed and then installed into an electrophotographic apparatus in the same manner as that mentioned in the first preferred embodiment.

There will now be illustrated design data of the optical scanning device 44 actually designed and optical characteristics detected in simulation according to the design data. The general design data of the optical scanning device 44 were set as follows:

Effective scanning length: 220 (mm)

Wavelength used: 780 (mm)

Optical path length from the center of rotation of the polygon mirror 24 to the cylindrical surface 39a of the photosensitive drum 39: 173.53 (mm)

The design data of the polygon mirror 24 were set as follows:

Radius of the inscribed circle: 14.0 (mm)

Shape of each reflecting surface: elliptic cylindrical surface with its major axis parallel to the horizontal scanning direction; Length of the major axis: 91.0 (mm); Length of the minor axis: 68.838 (mm)

The design data of the correcting lens 28 were set as follows:

Refractive index: 1.48609

Center thickness: 5.0 (mm)

Distance between the peak of the incident surface 40 and the center of rotation of the polygon mirror 24: 38.2 (mm)

Displacement $\Delta$: 1.434 (mm)

Center radius: 12.137 (mm)

Second-order coefficient $\alpha_2$ of the incident surface 40: $7.361 \times 10^{-3}$ Fourth-order coefficient $\alpha_4$ of the incident surface 40: $6.732 \times 10^{-7}$ Sixth-order coefficient $\alpha_6$ of the incident surface 40: $-6.848 \times 10^{-10}$ Eighth-order coefficient $\alpha_8$ of the incident surface 40: $4.383 \times 10^{-13}$ Second-order coefficient $\beta_2$ of the emergent surface 42: $8.121 \times 10^{-3}$ Fourth-order coefficient $\beta_4$ of the emergent surface 42: $1.410 \times 10^{-6}$ Sixth-order coefficient $\beta_6$ of the emergent surface 42: $-4.243 \times 10^{-10}$ Eighth-order coefficient $\beta_8$ of the emergent surface 42: $4.044 \times 10^{-14}$ The design data of the plano-convex lens 15 were set as follows:

Center thickness: 2.0 (mm)

Refractive index: 1.5115

Incident surface: R38.1 (mm)

Emergent surface: plane

Distance between the principal plane of the lens 15 and the deflection point of the polygon mirror 24: 30 (mm)

The design data of the cylindrical lens 14 were set as follows:

Center thickness: 2.0 (mm)

Refractive index: 1.5115

Incident surface: R27.5 (mm)

Emergent surface: plane

Distance between the principal plane of the lens 14 and the principal plane of the plano-convex lens 15: 4.2 (mm)

In the optical scanning device 44 designed above, the very short distance 4.2 (mm) between the plano-convex lens 15 and the cylindrical lens 14 is due to the structure that the cylindrical lens plate 45 permitting the displacement of the cylindrical lens 14 in the vertical scanning direction is flattened in the direction of the optical axis of the cylindrical lens 14.

As the optical characteristics detected in simulation according to the design data of the optical scanning device 44 designed above, there will now be illustrated characteristic curves of image plane bendings in the horizontal scanning direction and the vertical scanning direction in FIGS. 9(a) to 13(b).

In the characteristic graphs shown in FIGS. 9(a) to 13(b), the image plane bendings in the horizontal scanning direction in various conditions are shown in FIGS. 9(a), 10(a), 11(a), 12(a), and 13(a), whereas the image plane bendings in the vertical scanning direction in various conditions are shown in FIGS. 9(b), 10(b), 11(b), 12(b), and 13(b). In each characteristic graph, the axis of ordinate represents a distance between the scanning center on the surface to be scanned, and the maximum is 110 (mm) corresponding to the half of an effective scanning length of an A4-sized surface, whereas the axis of abscissa represents an amount of occurrence of the image plane bending, wherein the negative direction corresponds to a direction of approach toward the correcting lens 28. Further, in each characteristic graph, the solid line represents the image plane bending in each of the horizontal scanning direction and the vertical scanning direction, whereas the broken line represents the result of evaluation of an image plane by differential rays of light in the reversed direction.

Figure 9A:
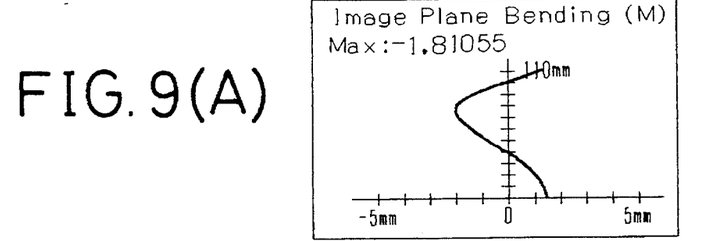
FIG. 9(a) is a characteristic graph showing image plane bending in the horizontal scanning direction according to design data of the optical scanning device shown in FIG. 6.
Figure 9B:
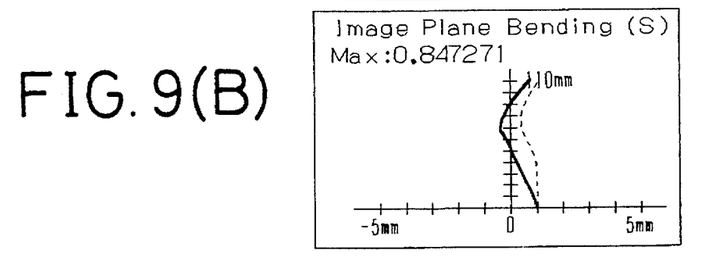
FIG. 9(b) is a characteristic graph showing image plane bending in the vertical scanning direction according to design data of the optical scanning device shown in FIG. 6.

Thus, the image plane bendings were detected in simulation according to the design data of the optical scanning device 44 designed above. As shown in FIG. 9(a), the maximum value of the image plane bending in the horizontal scanning direction was about 1.8 (mm), and as shown in FIG. 9(b), the maximum value of the image plane bending in the vertical scanning direction was about 0.8 (mm). Thus, it was found that the optical characteristics are very good.

Figure 10A:
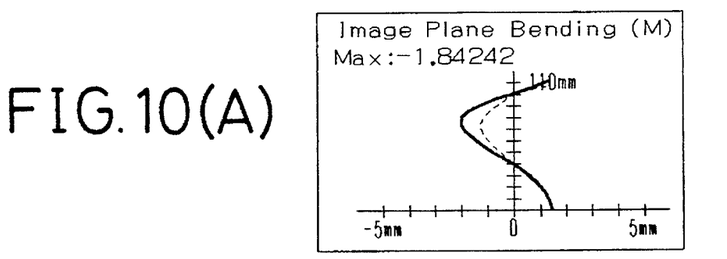
FIG. 10(a) is a graph similar to FIG. 9(a) in the condition where the correcting lens is displaced in the vertical scanning direction.
Figure 10B:
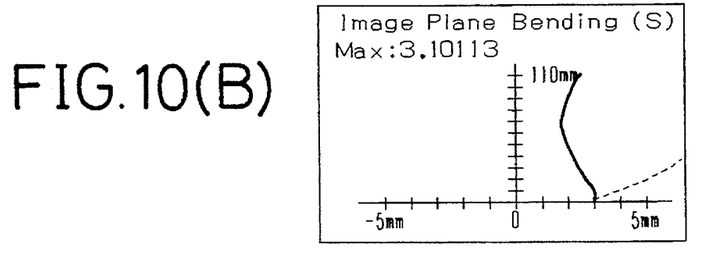
FIG. 10(b) is a graph similar to FIG. 9(b) in the condition where the correcting lens is displaced in the vertical scanning direction.

In the condition where the correcting lens 28 was displaced by 0.1 (mm) in the vertical scanning direction, the image plane bendings were detected similarly. As shown in FIG. 10(a), a change in the image plane bending in the horizontal scanning direction from the value shown in FIG. 9(a) was minute, but as shown in FIG. 10(b), the change in the vertical scanning direction was 3.1 (mm) for the solid line and 5.0 (mm) for the broken line. This result implies that the image plane bending in the vertical scanning direction largely occurs in forming horizontal scanning lines with the optical scanning device 44.

Figure 11A:
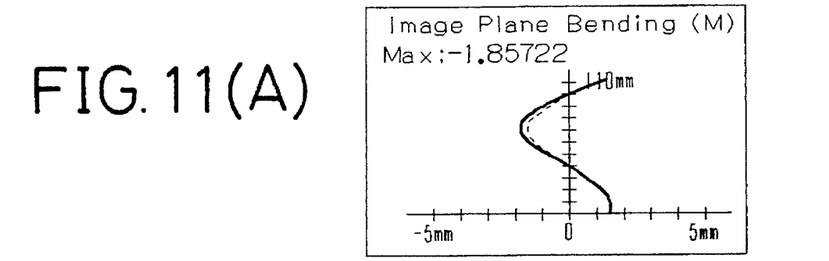
FIG. 11(a) is a graph similar to FIG. 9(a) in the condition where the correcting lens is displaced in the vertical scanning direction and the cylindrical lens is adjusted in position.
Figure 11B:
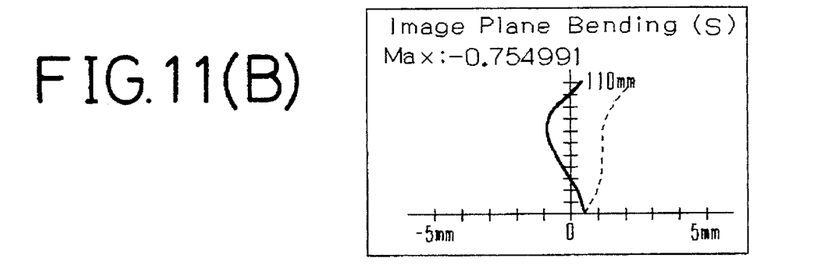
FIG. 11(b) is a graph similar to FIG. 9(b) in the condition where the correcting lens is displaced in the vertical scanning direction and the cylindrical lens is adjusted in position.

In the condition where the correcting lens 28 was displaced as mentioned above and the cylindrical lens 14 was displaced by 0.1 (mm) in the vertical scanning direction, the image plane bendings were detected similarly. As shown in FIGS. 11(a) and 11(b), it was found that the results approximate to those shown in FIGS. 9(a) and 9(b) are obtained in both the horizontal scanning direction and the vertical scanning direction. These results imply that optical aberration due to a mounting error or the like of the correcting lens 28 can be corrected by the positional adjustment of the cylindrical lens 14.

Figure 12A:
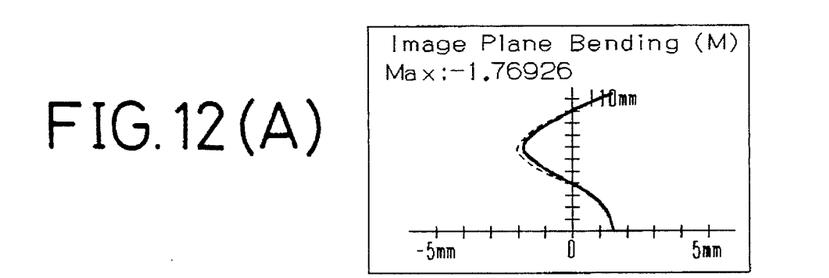
FIG. 12(a) is a graph similar to FIG. 9(a) in the condition where the tilt of the reflecting surfaces of the polygon mirror occurs.
Figure 12B:
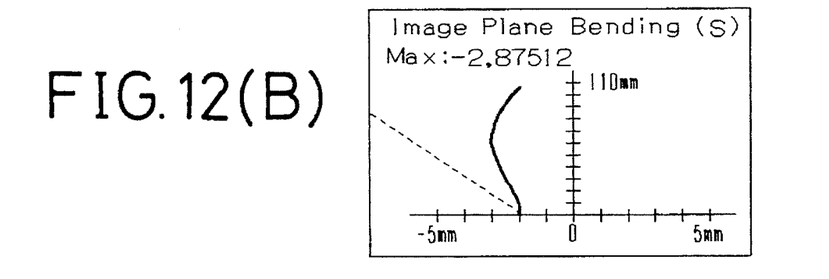
FIG. 12(b) is a graph similar to FIG. 9(b) in the condition where the tilt of the reflecting surfaces of the polygon mirror occurs.

In the condition where the tilt of the reflecting surfaces 25 of the polygon mirror 24 by an angle of 0.1° occurred, the image plane bendings were detected similarly. As shown in FIG. 12(a), a change in the image plane bending in the horizontal scanning direction from the value shown in FIG. 9(a) was minute, but as shown in FIG. 12(b), the change in the vertical scanning direction was large.

Figure 13A:
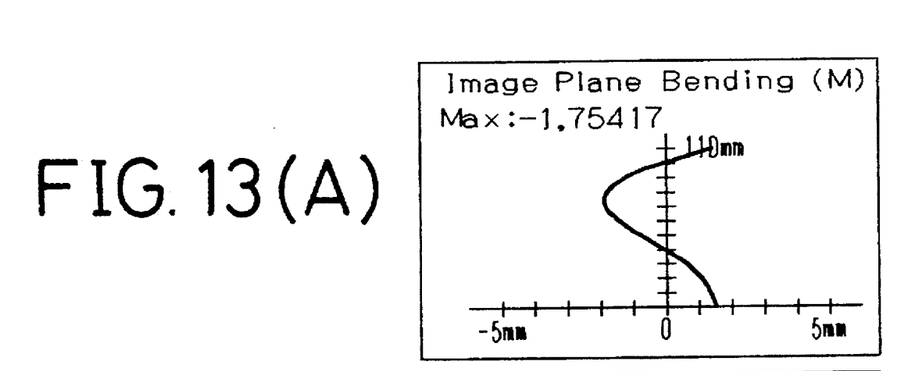
FIG. 13(a) is a graph similar to FIG. 9(a) in the condition where the tilt of the reflecting surfaces of the polygon mirror occurs and the cylindrical lens is adjusted in position.
Figure 13B:
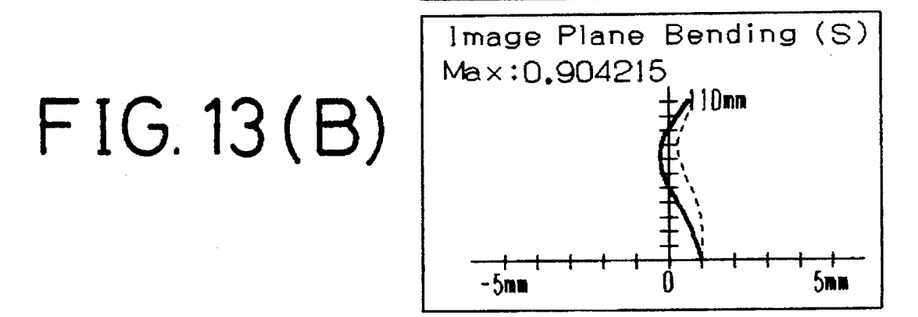
FIG. 13(b) is a graph similar to FIG. 9(b) in the condition where the tilt of the reflecting surfaces of the polygon mirror occurs and the cylindrical lens is adjusted in position.

In the condition where the tile of the reflecting surfaces 25 occurred as mentioned above and the cylindrical lens 14 was displaced by 0.1 (mm) in the vertical scanning direction, the image plane bendings were detected similarly. As shown in FIGS. 13(a) and 13(b), it was found that the results approximate to those shown in FIGS. 9(a) and 9(b) are obtained. These results imply that optical aberration due to the tilt of the reflecting surfaces 25 of the polygon mirror 24 can also be corrected by the positional adjustment of the cylindrical lens 14.

Figure 14:
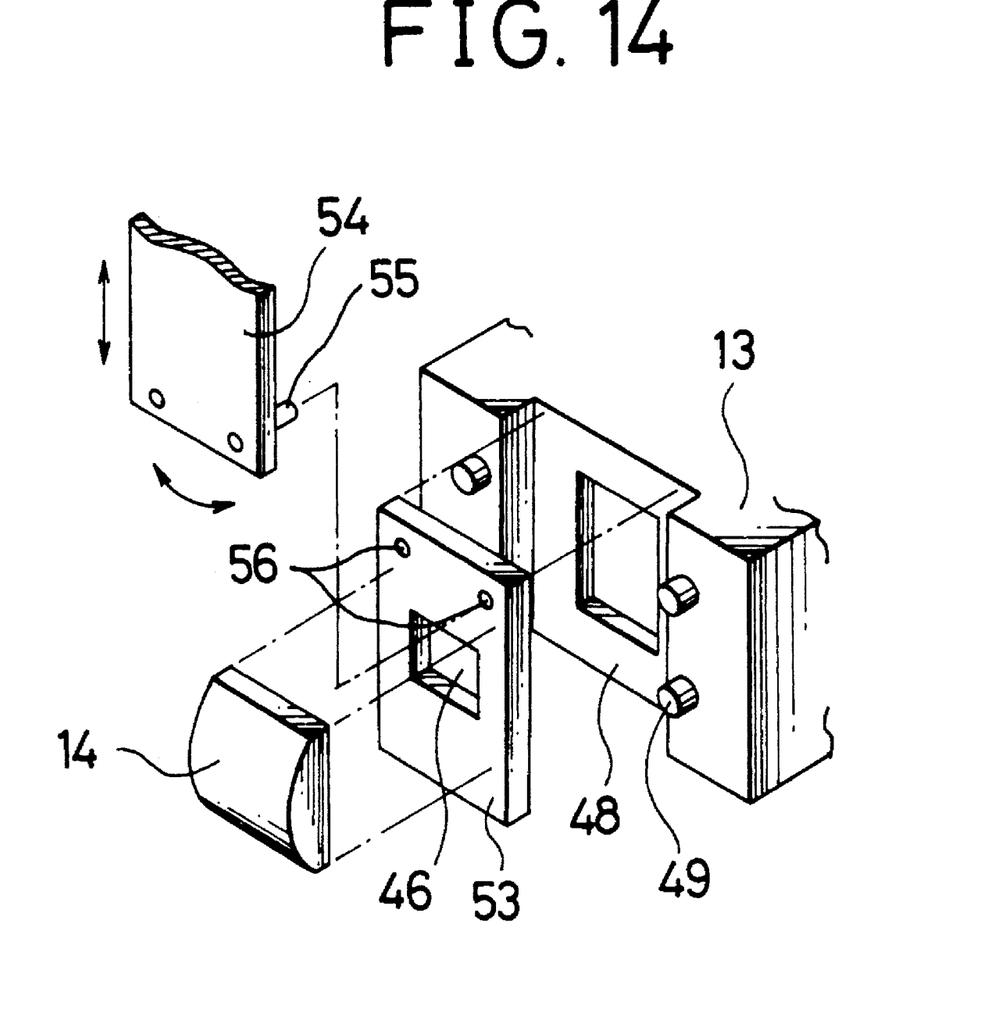
FIG. 14 is an exploded perspective view similar to FIG. 8, showing a modification of the cylindrical lens plate.

In the optical scanning device 44 according to this preferred embodiment, as shown in FIG. 8, the width of the cylindrical lens plate 45 is set substantially equal to the width of the recess 48 of the internal frame 13 to prevent rotation of the cylindrical lens 14 during sliding movement thereof, and the single hole 52 adapted to engage with the single projection 51 of the jig 50 is formed at the upper portion of the cylindrical lens plate 45. This structure is illustrative and a modification as shown in FIG. 14 may be made. In this modification, the width of a cylindrical lens plate 53 is set smaller than the width of the recess 48 of the internal frame 13 to permit slight rotation of the cylindrical lens 14 as well as sliding movement thereof, and two holes 56 adapted to engage with two projections 55 of a jig 54 are formed at the upper portion of the cylindrical lens plate 53.

With this structure, in sliding the cylindrical lens 14 in the vertical scanning direction to adjust the position thereof, an angle of rotation of the cylindrical lens 14 about its optical axis can also be adjusted at the same time, thereby obtaining better optical characteristics. In such a case, the recess 48 of the internal frame 13 may be omitted.

Further, in the optical scanning device 44 wherein the cylindrical lens plate 45 to which the cylindrical lens 14 is preliminarily fixed is closely fitted with the recess 48 of the internal frame 13 and is adapted to be slid therein as shown in FIG. 8, the angle of rotation of the cylindrical lens 14 about its optical axis may be preliminarily adjusted in fixing the cylindrical lens 14 to the cylindrical lens plate 45.

It is to be noted that the terms relating to a direction, such as "over" and "under" used in the present invention are conveniently defined for the simplicity of explanation and are not intended to limit the location and the direction of the device in actual use.

What is claimed is:

1. In an optical scanning device including a semiconductor laser diode, a rotatable polygon mirror having a plurality of reflecting surfaces located on an optical path of a laser beam emitted from said semiconductor laser diode, at least a collimator lens, an imaging lens, a cylindrical lens and a return mirror located on said optical path of said laser beam between said semiconductor laser diode and said reflecting surfaces of said polygon mirror, a surface to be scanned located on an optical path of a horizontal scanning light beam from said reflecting surfaces of said polygon mirror, said surface to be scanned being movable in a vertical scanning direction, and at least a correcting lens located on said optical path of a said horizontal scanning light beam between said reflecting surfaces of said polygon mirror and said surface to be scanned; the improvement wherein optical centers of said semiconductor laser diode, said collimator lens, said cylindrical lens, said return mirror, and said correcting lens are located substantially in a plane containing an axis of rotation of said polygon mirror; and said semiconductor laser diode, said collimator lens and said cylindrical lens are located over an upper surface of said polygon mirror, and said semiconductor laser diode and said collimator lens are located substantially in a projection region defined by vertical planes colinear with sides of said polygon mirror.

2. An optical scanning device for leading a laser beam emitted from semiconductor laser diode through a collimator lens, an imaging lens, and a cylindrical lens to a plurality of reflecting surfaces of a rotatable polygon mirror, and scanning a surface to be scanned movable in a vertical scanning direction with said laser beam reflected on said reflecting surfaces of said polygon mirror and transmitted through a correcting lens; said optical scanning device comprising:

said semiconductor laser diode having an optical center located substantially in a plane containing an axis of rotation of said polygon mirror, said semiconductor laser diode being located substantially in a projection region defined by vertical planes colinear with sides of said polygon mirror and over an upper surface of said polygon mirror;

said collimator lens having an optical center located substantially in said plane, said collimator lens being located in said region over said upper surface of said polygon mirror;

said cylindrical lens having an optical center located substantially in said plane, said cylindrical lens being located in said region over said upper surface of said polygon mirror;

a return mirror having an optical center located substantially in said plane, for deflecting said laser beam emerging from said cylindrical lens and leading said deflected laser beam to said reflecting surfaces of said polygon mirror; and said correcting lens having an optical center located substantially in said plane.

3. An optical scanning device according to claim 2, further comprising:

a drive motor for rotatably supporting said polygon mirror;

a plate-like base for supporting said drive motor;

a housing mounted on said base, all of said semiconductor laser diode, said collimator lens, said cylindrical lens, said return mirror, and said correcting lens being mounted in said housing, said polygon mirror being surrounded by said housing;

at least one external reflecting mirror for deflecting an optical path of said laser beam transmitted through said correcting lens toward said surface to be scanned; and an external frame mounted on an outer surface of said housing, said external reflecting mirror being mounted on said external frame.

4. An optical scanning device according to claim 3, further comprising a mirror adjusting mechanism provided on said external frame for displaceably supporting said external reflecting mirror directly opposed to said surface to be scanned and positioning said external reflecting mirror.

5. An optical scanning device according to claim 3, further comprising:

an optical sensor provided on said external frame for detecting a writing position; and a reflecting mirror provided on said external frame and located on said optical path of said laser beam transmitted through said correcting lens for deflecting said transmitted laser beam toward an optical sensing element of said optical sensor.

6. An optical scanning device according to claim 3, further comprising an internal frame mounted on an inner surface of said housing, all of said imaging lens, said cylindrical lens, and said return mirror being mounted on said internal frame.

7. An optical scanning device according to claim 6, wherein said internal frame has an aperture for shaping said laser beam emerging from said cylindrical lens.

8. An optical scanning device according to claim 3, further comprising a light emitting unit mounted on said housing, both of said semiconductor laser diode and said collimator lens being mounted in said light emitting unit so that centering of said laser beam is permitted.

9. An optical scanning device according to claim 2, further comprising a lens supporting mechanism for supporting said cylindrical lens movably on a plane perpendicular to an optical axis of said cylindrical lens and positioning said cylindrical lens.

10. An optical scanning device according to claim 9, wherein said cylindrical lens is movable in said vertical scanning direction.

11. An optical scanning device according to claim 9, wherein said cylindrical lens is rotatable about said optical axis.

12. An optical scanning device according to claim 9, wherein said housing has a through hole exposed to said lens supporting mechanism.

13. An optical scanning device according to claim 2, further comprising:

a drive motor for rotatably supporting said polygon mirror;

a plate-like base for supporting said drive motor;

a housing mounted on said base, all of said semiconductor laser diode, said collimator lens, said cylindrical lens, said return mirror, and said correcting lens being mounted in said housing, said polygon mirror being surrounded by said housing;

at least one external reflecting mirror for deflecting an optical path of said laser beam transmitted through said correcting lens toward said surface to be scanned;

an external frame mounted on an outer surface of said housing, said external reflecting mirror being mounted on said external frame;

a mirror adjusting mechanism provided on said external frame for displaceably supporting said external reflecting mirror directly opposed to said surface to be scanned and positioning said external reflecting mirror;

an internal frame mounted on an inner surface of said housing, all of said imaging lens, said cylindrical lens, and said return mirror being mounted on said internal frame; and a light emitting unit mounted on said housing, both of said semiconductor laser diode and said collimator lens being mounted in said light emitting unit so that centering of said laser beam is permitted.

* * * * *